United States Patent [19]

Berneburg et al.

[11] Patent Number: 5,035,921
[45] Date of Patent: Jul. 30, 1991

[54] PROCESSING OF CARBON/CARBON COMPOSITES USING SUPERCRITICAL FLUID TECHNOLOGY

[75] Inventors: Philip L. Berneburg, Potomac, Md.; Val J. Krukonis, Lexington, Mass.

[73] Assignee: The Babcock & Wilcox Company, New Orleans, La.

[21] Appl. No.: 145,071

[22] Filed: Jan. 19, 1988

[51] Int. Cl.$^5$ .............................. B05D 3/02
[52] U.S. Cl. ................... 427/226; 427/228; 427/294; 427/377; 427/387; 427/398.1
[58] Field of Search ............ 427/226, 398.1, 228, 427/244, 387, 377

[56] References Cited

U.S. PATENT DOCUMENTS

| | | | |
|---|---|---|---|
| 4,267,210 | 5/1981 | Yajima et al. | 427/226 |
| 4,267,211 | 5/1981 | Yajima et al. | 427/228 |
| 4,552,786 | 11/1985 | Berneburg et al. | 427/248.1 |

OTHER PUBLICATIONS

*Condensed Chemical Dictionary*, 6th Ed., Rheinhold N.Y., 1961, pp. 239 and 976.

*Primary Examiner*—Janyce Bell
*Attorney, Agent, or Firm*—Vytas R. Matas; Robert J. Edwards; Daniel S. Kalka

[57] ABSTRACT

A process for improving the oxidation resistance of carbon or graphite fiber reinforced carbon composites includes infiltrating the structure with a ceramic precursor-laden supercritical fluid, depositing the ceramic precursor within the internal porosity and pyrolyzing the precursor material in situ.

15 Claims, No Drawings

PROCESSING OF CARBON/CARBON COMPOSITES USING SUPERCRITICAL FLUID TECHNOLOGY

This invention was made with Government Support under Air Force Contract F49620-85-C-0041, Department of Health and Human Services Contract 1R01AG03151-03, and DARPA Contract MDA903-83-C-0017. The Government has certain rights in this invention.

BACKGROUND OF THE INVENTION

The present invention relates to the oxidation protection of carbon/carbon composites that are composed of a carbon matrix reinforced with carbon or graphite fibers, and more particularly, to the oxidation protection system achieved by impregnation of the composite with ceramic precursors dissolved in a supercritical fluid.

Impregnation of low density composite bodies has been typically accomplished by immersing a ceramic part in a bath of a chemical solution, slurry, or melt, often under vacuum to assist the removal of trapped air. Multiple immersions are commonly necessary to achieve sufficient penetration and densification. With these conventional impregnation techniques, complete penetration of the internal porosity has been extremely difficult or impossible due to the sealing-off of passageways to the interior of the body which occurs during the impregnation process. Moreover, sufficient densification/impregnation may also be difficult due to the surface tension and high viscosities of some impregnants or large slurry particle sizes relative to the available openings in the body.

Supercritical fluids are gases and liquids at conditions above their respective thermodynamic critical points which exhibit: high pressure-dependent solvent power for many substances of normally low solubility; near ambient temperature processing capability, low viscosity and high diffusivity; and the absence of surface tension. For any particular supercritical fluid, at sufficiently high pressure, the isobaric solubility of a material increases as a function of temperature. At a given temperature (above the critical temperature of the fluid) a decrease in pressure reduces the solubility of the dissolved material in the fluid.

Supercritical fluid phenomena have been investigated primarily for purposes of extraction. Recent applications have included such processes as regeneration of activated carbon, separation of alcohol from water, and extraction of oils and pharmacological compounds.

Supercritical fluids, for example, have been used for the recovery of certain materials from foodstuffs and other starting materials. U.S. Pat. No. 3,806,619 (Zosel), for example, discloses the use of supercritical carbon dioxide for recovery of caffeine. U.S. Pat. No. 4,104,409 (Vitzhum et al) describes the removal of certain resins from hops using supercritical carbon dioxide and other compounds. U.S. Pat. No. 4,167,589 (Vitzhum et al) shows the impregnation of dearomatized, decaffeinated tea using supercritical fluids such as carbon dioxide. U.S. Pat. No. 4,354,922 (Derbyshire et al) shows a dense gas solvent, in a supercritical fluid state above its critical temperature and pressure, used to extract heavy hydrocarbon oil constituents. The Derbyshire et al '922 patent teaches lowering of pressure (while maintaining the temperature above the critical temperature), or raising the temperature, to precipitate out the dissolved hydrocarbon constituents. It has thus been demonstrated that supercritical fluids are applicable for extracting normally insoluble materials and removing them from a base material. Vitzhum et al '589 also teaches that supercritical carbon dioxide can absorb certain aromatic constituents of tea, and upon subsequent dissociation can redeposit these aromatics in the tea. U.S. Pat. No. 4,241,112 (Kostandov et al) discloses the successive deposition of an organometallic catalyst on the surface of a solid filler. The deposition of the second component of the catalyst is gas or liquid phase deposition, and a simultaneous polymerization of olefins on a first deposited catalyst component is carried out at temperatures which in some cases fall within the supercritical regime.

U.S. Pat. No. 4,552,786 to Berneburg et al which is incorporated here by reference, teaches the use of supercritical fluids to deposit a ceramic precursor in the void spaces of a ceramic, silicon nitride, silicon carbide or aluminum borosilicate host material.

None of the references have applied supercritical fluid technology to the impregnation of carbon/carbon composites with oxidation resistant ceramic precursors. Partially as a result of their inherent porosity, carbon/carbon composites are not as oxidation resistant as is desired. Until now, external coatings, which are prone to separation (spalling) from the surface, and particulate dispersions of non-oxide ceramics in the carbon matrix, were the only usable forms of oxidation protection currently available.

SUMMARY OF THE INVENTION

Carbon/carbon composites, consisting of a carbon matrix reinforced with carbon or graphite fibers, are fabricated by vacuum impregnating formed fiber shapes with a carbon-containing material such as a phenolic resin, pitch or furfuryl alcohol, followed by pyrolysis to form a carbon or graphite matrix. Multiple, successive impregnation and pyrolysis cycles are then performed to densify the component by matrix addition.

Supercritical fluids are used as solvents to infiltrate carbon/carbon composites and impregnate them with compatible ceramic matrix precursors carried by the fluid. Subsequent pyrolysis of the newly added ceramic matrix precursor material results in the formation of an oxidation resistant porosity filler or coating, and improved oxidation resistance of the composite.

In accordance with the invention, a process for impregnating and increasing the oxidation resistance of a porous carbon/carbon composites comprises dissolving a ceramic or carbon matrix precursor in a supercritical fluid; infiltrating, i.e. penetrating, the carbon/carbon composite with the precursor-laden supercritical fluid; reducing the solubility of the precursor in the fluid to precipitate, i.e. impregnate, the precursor in void spaces of the carbon/carbon composite; and pyrolyzing the impregnated composite.

Supercritical fluid processing has several advantages. Supercritical fluids can penetrate extremely small openings due to the lack of surface tension and the low viscosity characteristics of supercritical fluids. Thus, supercritical fluid solvents can penetrate significantly smaller openings than conventional fluids. They can be used to uniformly deposit materials internally within the carbon/carbon composites as a result of the highly pressure and temperature-dependent nature of the solubility of materials in supercritical fluids. Processing can also be accomplished at relatively low temperatures by selection of a working fluid with a near-ambient critical temperature.

The inventive technique is designed to provide consistently reproducible carbon/carbon composites with improved mechanical properties and better oxidation resistance, as a result of more uniform and complete matrix impregnation with stable compounds.

DETAILED DESCRIPTION

Supercritical fluids exhibit a number of characteristics which offer great utility in the processing of carbon/carbon composites. It is well-known that at temperatures and pressures above their respective thermodynamic critical points, dense gases possess unusually high solvent power for many normally insoluble materials. Moreover, it has been observed that the solubility of these materials in supercritical gases is highly pressure dependent. In addition to the ability to dissolve high molecular weight compounds, polymers and other materials, supercritical fluids possess favorable transport properties such as low viscosity and high diffusivity. Furthermore, the absence of surface tension improves the penetration of the fluid into submicron size pores.

Supercritical fluids, moreover, exhibit other properties in addition to the controllable pressure and temperature-dependent solvent power, which suggest favorable utility for impregnation. In particular, supercritical fluids are typically of a highly permeative nature. Although common supercritical fluids such as carbon dioxide or propane in the supercritical state exhibit densities approaching those of most organic solvents, they have much lower viscosities than these solvents and no surface tension. This combination of attributes results, under suitable conditions, in the ability of supercritical fluids to penetrate extremely small openings and thus can be used as carriers of materials for impregnation.

In accordance with the invention, supercritical fluid processing is employed to impregnate partially or fully processed composites with oxidation-resistant materials in the form of ceramic or carbon matrix precursors in order to provide internal as well as external oxidation protection.

In order for the precursor to be satisfactory, it must be soluble in at least one supercritical fluid so that it can be carried into the pores of the parts to be impregnated and then precipitated in-situ. The precursor must also not react with the supercritical fluid. Polycarbosilane is a preferred precursor because it can be readily decomposed by pyrolysis to yield a large amount of silicon carbide residue. Polysilane is another suitable precursor. N-hexylcarborane could be a precursor for boron (tetra-) carbide ($B_4C$) which may be oxidized to $B_2O_3$. It is believed that suitable precursors are soluble in hexane. A porous carbon/carbon composite host part may be manufactured by any suitable technique, for example, by assembly of phenolic-impregnated graphite or carbon fibers into a preform shape, such as by molding of phenolic impregnated carbon cloth, and then curing and pyrolyzing the preform to yield a porous carbon/carbon composite part. The part, in accordance with the invention, is then subjected to multiple impregnations with polycarbosilane laden supercritical propane and pyrolyzed to yield a denser, silicon carbide impregnated carbon/carbon composite.

For carrying out the impregnation, the host part which is to be impregnated is placed into a pressure vessel containing the matrix precursor. The host part is separated from the impregnant (precursor) by a barrier, such as glass wool. The barrier assures that the impregnant is not "wicked". The vessel is then sealed and the interior raised to a temperature and pressure sufficient to dissolve the compound. After a period of time for sufficient contact of the host part and precursor, the pressure and/or temperature are reduced, at a constant rate, to decrease the solubility and deposit the precursor in the porous body. Thereafter, the body is pyrolyzed.

Pyrolysis of the impregnated part comprises heating the part in an inert atmosphere to thermally decompose the matrix precursor. Pyrolysis may occur in a nonoxidizing atmosphere Volatile species are produced which exit from the host part and a silicon carbide residue is left in the pore spaces of the part. The resulting silicon carbide residue is oxidation resistant and reduces the total pore volume or porosity which existed before impregnation. With each impregnation and pyrolysis cycle, additional matrix silicon carbide is deposited in the remaining pores, further reducing the total pore volume. The specific pyrolysis condition used (atmosphere, temperature, time) depend on the impregnant to be pyrolyzed.

In the commercial production of carbon/carbon composites, phenolic resin reimpregnation and pyrolysis is typically repeated up to approximately four cycles. Supercritical fluid impregnation cycles may be substituted for some of the matrix resin impregnations if more silicon carbide is desired. The process conditions for multiple supercritical fluid impregnations will not necessarily be identical for each cycle of a series of impregnations.

Test results demonstrating illustrative examples of the invention are described further in the following examples:

EXAMPLE 1

2D carbon/carbon composites were impregnated with high molecular weight polycarbosilane polymer fractions. Preliminary tests demonstrated that the pyrolyzed char yield of polycarbosilane was increased by fractionating the as-received polymer using supercritical propane and discarding the low-yield low-molecular weight fractions. The increased char yield high molecular weight residue was then used in subsequent supercritical fluid impregnations.

The precursor was fractionated by increasing both temperature and pressure. The temperature ranged from 120° C. up to 4900 psi and 165° C. thereafter up to 6500 psi. The pressure ranged from 1000 psi to 6500 psi. The average molecular weight at 1000 psi was 432; at 1000–1900 psi it was 449; at 1900–2700 psi it was 973; at 2700–3400 psi it was 1540; at 3400–4900 psi it was 2490; and at 4900–6500 psi it was 4070. A molecular weight greater than 900 is preferred.

The polycarbosilane was dissolved in supercritical propane in the presence of the sample at temperatures between 120° C. and 300° C. with a preferred temperature of 160° C. The pressure ranged from 3000 to 9000 psi with 6000 psi being preferred. Following a hold period of from 0.25 to 16 hours with one hour preferred the temperature and pressure were decreased to precipitate the polymer within the pores of the carbon/carbon composite samples. Multiple intermediate impregnations were carried out after cross linking previously deposited polymer to decrease its solubility. After one to three impregnation/cross linking cycles, the samples were pyrolyzed at a temperature of about 1000° C. in an inert atmosphere to form the silicon carbide matrix addition. The above processing cycle was carried out one to three times.

Impregnated test coupons were compared to as received samples in either a static oxidation test at 950° F. or a stressed oxidation test at 1100° F. Supercritical fluid impregnated samples exhibited a 0.5 percent weight loss after a seven hour static oxidation test exposure compared to a four percent loss for the as received samples. In the 1100° F. the stressed oxidation test, the impregnated samples exhibited a time to failure of two hours compared to one half hour failure time of the as-received samples.

Finally, three point flexure strength increased from 29 ksi for as received samples to 42 ksi for supercritical fluid impregnated ACC2 carbon/carbon composite test sample. In all impregnated samples, microchemical analysis such as scanning electron microscopy with energy dispersive spectroscopy revealed significant accumulations of silicon carbide throughout the internal porosity of the samples, fiber/matrix interfacial gaps as small as one micron across were found filled with silicon carbide.

EXAMPLE 2

3D carbon/carbon samples were impregnated with the high molecular weight fraction of polycarbosilane. These samples were selected because they exhibited low porosity (i.e. 3 to 4 percent) and because the 3D fiber architecture precluded matrix oxidation inhibition systems.

Polymer dissolution and impregnation conditions cited in Example 1 were utilized. Following six such impregnations and final pyrolysis, the samples were sectioned to determine the distribution of silicon carbide. Microchemical analysis revealed that micron sized gaps between the tow bundles and matrix were well filled with silicon carbide.

The foregoing description has been directed to particular preferred embodiments of the present invention for purposes of explanation and illustration. It should be recognized, however, by those skilled in the art that modifications and changes in the invention may be made without departing from the scope and spirit of the invention. It is therefore intended that the following claims cover all equivalent modifications and variations as fall within the scope of the invention as defined by the claims.

The embodiment of the invention in which an exclusive property or privilege is claimed are defined as follows:

1. A process for increasing the oxidation resistance of a porous carbon/carbon composite comprising the steps of:
    dissolving a ceramic precursor selected from the group consisting of polycarbosilane, polysilane, and n-hexylcarborane in a supercritical fluid;
    infiltrating the carbon/carbon composite with the ceramic precursor-laden supercritical fluid;
    reducing the pressure of the ceramic precursor-laden supercritical fluid to decrease the solubility of the ceramic precursor in the fluid to precipitate the ceramic precursor within the internal porosity of the carbon/carbon composite and thereby impregnate the carbon/carbon composite; and
    pyrolyzing the impregnated composite.

2. A process for increasing the oxidation resistance of a porous carbon/carbon composite as set forth in claim 1 further comprising the step of reducing the temperature of the ceramic precursor-laden supercritical fluid to decrease the solubility of the ceramic precursor in the fluid to precipitate the ceramic precursor within the internal porosity of the carbon/carbon composite.

3. A process for increasing the oxidation resistance of a porous carbon/carbon composite as set forth in claim 1 wherein the step of pyrolyzing the impregnated composite comprises heating the impregnated composite in an inert atmosphere.

4. A process for increasing the oxidation resistance of a porous carbon/carbon composite as set forth in claim 1 wherein the step of pyrolyzing the impregnated composite comprises heating the impregnated composite in a non-oxidizing atmosphere.

5. A process for increasing the oxidation resistance of a porous carbon/carbon composite as set forth in claim 1 wherein the supercritical fluid is a member selected from the group consisting of methane, ethylene, carbon dioxide, ethane, nitrous oxide, propane, and butane.

6. A process for increasing the oxidation resistance of a porous carbon/carbon composite as set forth in claim 1 including the steps of successively infiltrating the carbon/carbon composite prior to the pyrolyzing step and then crosslinking the ceramic precursor deposit after each infiltration step.

7. A process for increasing the oxidation resistance of a porous carbon/carbon composite as set forth in claim 6 wherein the steps of successively infiltrating the carbon/carbon composite is performed from three to six times.

8. A process for increasing the oxidation resistance of a porous carbon/carbon composite as set forth in claim 1 including the step of fractionating the ceramic precursor prior to dissolving the ceramic precursor in a supercritical fluid.

9. A process for increasing the oxidation resistance of a porous carbon/carbon composite comprising the steps of:
    fractionating polycarbosilane for a molecular weight fraction greater than about 900;
    dissolving the fractionated polycarbosilane in a supercritical fluid;
    infiltrating the carbon/carbon composite with the fractionated polycarbosilane-laden supercritical fluid;
    reducing the pressure of the fractionated polycarbosilane-laden supercritical fluid to decrease the solubility of the fractionated polycarbosilane within the carbon/carbon composite to thereby impregnate the carbon/carbon composite; and
    pyrolyzing the impregnated composite.

10. A process for increasing the oxidation resistance of a porous carbon/carbon composite as set forth in claim 9 further comprising the steps of successively infiltrating the carbon/carbon composite and then crosslinking the polycarbosilane deposit after each infiltration step prior to the pyrolyzing step.

11. A process for increasing the oxidation resistance of a porous carbon/carbon composite as set forth in claim 10 wherein the supercritical fluid is a member selected from the group consisting of methane, ethylene, carbon dioxide, ethane, nitrous oxide, propane, butane, and chloro-, fluoro-, and chlorofluoro-hydrocarbons.

12. A process for increasing the oxidation resistance of a porous carbon/carbon composite as set forth in claim 11 wherein the step of pyrolyzing comprises heating the impregnated composite in an inert atmosphere.

13. A process for increasing the oxidation resistance of a porous carbon/carbon composite comprising the steps of:
   fractionating a ceramic precursor selected from the group consisting of polycarbosilane, polysilane, and n-hexylcarborane;
   dissolving the fractionated ceramic precursor in a supercritical fluid selected from the group consisting of methane, ethylene, carbon dioxide, ethane, nitrous oxide, propane, and butane;
   infiltrating the carbon/carbon composite with the fractionated ceramic precursor-laden supercritical fluid;
   reducing the pressure of the ceramic precursor-laden supercritical fluid to decrease the solubility of the fractionated ceramic precursor within the carbon/carbon composite to thereby impregnate the carbon/carbon composite;
   successively infiltrating the carbon/carbon composite with a ceramic precursor;
   crosslinking the ceramic precursor deposit after each infiltration step; and
   pyrolyzing the impregnated composite.

14. A process for increasing the oxidation resistance of a porous carbon/carbon composite as set forth in claim 9, further comprising the step of reducing the temperature of the polycarbosilane-laden supercritical fluid to decrease the solubility of the polycarbosilane in the fluid to precipitate it within the internal porosity of the carbon/carbon composite.

15. An oxidation resistant carbon/carbon composite with increased strength produced in accordance with the process of claim 9.

* * * * *

UNITED STATES PATENT AND TRADEMARK OFFICE
CERTIFICATE OF CORRECTION

PATENT NO. : 5,035,921

DATED : Jul. 30, 1991

INVENTOR(S) : Berneburg et al.

It is certified that error appears in the above-identified patent and that said Letters Patent is hereby corrected as shown below:

On the Title page of the patent, listed under Inventors: kindly add the following two inventors: --Daniel R. Petrak, Midland, MI and Richard A. Wagner, Lynchburg, VA--.

Signed and Sealed this

Fifteenth Day of December, 1992

Attest:

DOUGLAS B. COMER

*Attesting Officer*  *Acting Commissioner of Patents and Trademarks*